Aug. 4, 1964  D. H. MURCH  3,143,722
VISUAL SIGNAL SYSTEM FOR AUTOMOTIVE VEHICLES
Filed Oct. 18, 1963

DAVID H. MURCH
INVENTOR

Huebner & Worrel
ATTORNEYS

United States Patent Office 3,143,722
Patented Aug. 4, 1964

3,143,722
VISUAL SIGNAL SYSTEM FOR AUTOMOTIVE
VEHICLES
David H. Murch, 1129 N. Yosemite Ave., Fresno, Calif.
Filed Oct. 18, 1963, Ser. No. 317,365
3 Claims. (Cl. 340—84)

This invention relates to a visual signaling system adapted for use with automotive vehicles, particularly emergency vehicles, such as ambulances, police cars, and the like. The invention especially relates to such a system providing an extensible support to elevate a visual signal and incorporating an indicating means for warning the operator of the vehicle of an elevated position of the signaling means.

Contemporary emergency vehicles normally employ audible signals, such as sirens, and visual signals in the form of flashing and/or rotating lights to warn pedestrians and the operators of other vehicles of the approach of such emergency vehicles. The signal lights are often difficult to observe by operators of other vehicles. Therefore, it is imperative that the signal light be displayed at a maximum height to afford the greatest opportunity of observation by such motorists. Accordingly, a need has been recognized for disposing the signal lights of emergency vehicles at a greater height than that now afforded by modern automobiles.

The operator of such a vehicle should be able to control the elevation of the signal means and be warned of its elevated position in the event that the path of travel includes an obstruction affording only limited vertical clearance for the vehicle.

Accordingly, it is an object of the present invention to provide a signaling system for automotive vehicles, such as ambulances, police cars, and the like, which facilitates detection and observation of a visual signal by other motorists and pedestrians.

Another object is to provide a signaling system with means to elevate a visual signaling device above the stream of moving traffic and thereby enhance its probability of detection.

Another object is to provide such a signaling system with means to warn the operator of the elevated position of the signaling device.

Another object of the invention is to provide a control means in such a signaling system which is utilized in conjunction with audible warning devices, such as sirens.

A further object of the invention is to provide a signaling system incorporating an elevationally adjustable signal light and mounting means therefor which is readily transferred from one automotive vehicle to another.

These objects will become more fully apparent upon reference to the following description and accompanying drawing.

Figure 1:
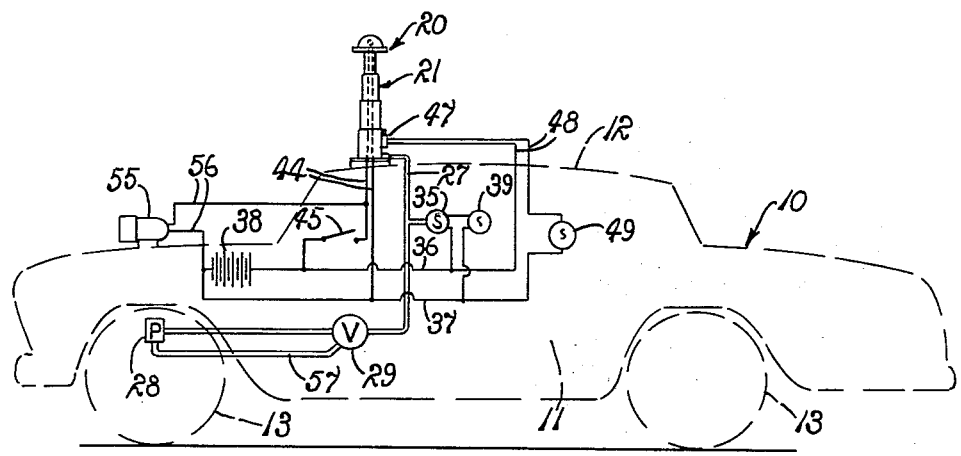
FIG. 1 is a view in side elevation of an automotive vehicle provided with a visual signaling system incorporating the principles of the present invention, portions of the control circuitry thereof being shown schematically.

Referring in greater particularity to FIG. 1, a vehicle 10 is shown in the form of a contemporary automobile having a relatively low profile. The vehicle includes a passenger supporting body 11 having a roof panel 12, fabricated of light gauge sheet steel. The vehicle is also provided with ground engaging wheels 13, at least two of which are driven by an engine, not shown, so as to be a self-propelled vehicle.

A visual signaling means in the form of a light 20 is carried at the upper end of a telescopic supporting cylinder 21 provided with a plurality of progressively larger sections 21a, 21b, and 21c. The light 20 is normally of the rotated beacon type, and in some forms is of the flashing type so as to increase the probability of detection by other motorists. The tubular sections of the support cylinder 21 provide an internal pressure fluid chamber 22 adapted to receive and confine pressure fluid admitted thereto. The support cylinder 21 is secured to and adapted to be received within a cylindrical tubular mounting base 23, when the support cylinder is in a retracted stowing position, as shown in full lines in FIG. 2. The mounting base 23 is provided with an annular flange 24 having a plurality of circumferentially spaced mounting holes adapted to receive metal screws 25 and thereby secure the base 23 to the roof panel 12 of the vehicle.

The base 23 is provided with an inlet port 26 in communication with a pressure fluid supply line 27 leading from a pump 28 as a source of pressure fluid. In automotive vehicles provided with hydraulically powered steering devices, the pump 28 may take the form of the hydraulic pump employed in such devices. In the alternative, the lubricating oil pump of conventional automobiles can be employed as a source of pressure fluid to effect extension of the telescopic support cylinder 21. A flow control valve 29 is interposed in the supply line 27 between the pump 28 and the inlet port 26 to effect powered extension of the cylinder 21 upon admission of pressure fluid to the chamber 22. In the form of the invention illustrated, the cylinder 21 is gravitationally biased to a retracted or stowing position, so that appropriate positioning of the valve 29 effects controlled extension and retraction of the cylinder 21 and selective elevational positioning of the light 20.

The signaling system of the present invention includes a pressure sensing switch 35 in communication with supply line 27. The switch 35 is adjusted to detect a pressure value in excess of that required to raise the cylinder 21 to an extended position, so that the switch 35 closes upon such predetermined pressure value being reached. The switch 35 is connected by means of electrical conductors 36 and 37 to a battery 38 as a source of electrical energy. A first indicator lamp 39 is in series with the switch 35, and is adapted to be illuminated upon closing of the switch 35, and thereby to warn the operator that the light 20 has been elevated to an extended signaling position. The lamp 39 is disposed at a position in the driver's or operator's, compartment so as to be readily viewable by the operator of the vehicle.

Figure 2:
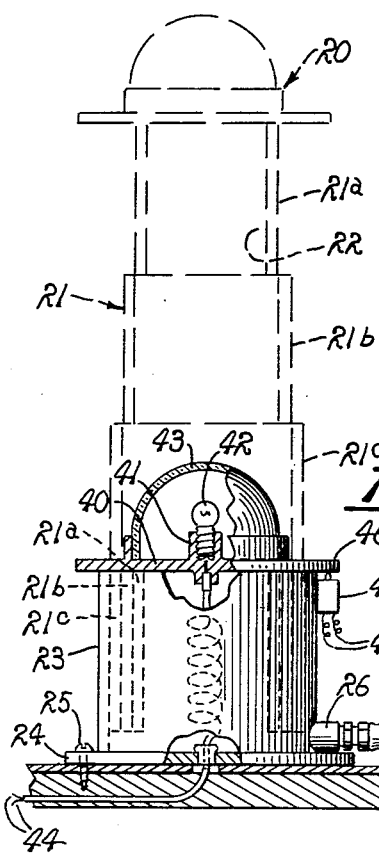
FIG. 2 is an enlarged fragmentary view of the system of FIG. 1 showing a support for a signal light thereof in full lines in a retracted or stowing position, and in dashed lines in an extending signaling position.

As can be seen in FIG. 2, the lamp 20 includes a support disc 40 secured to the tubular section 21a in fluid sealing relationship so as to close the chamber 22. A bulb socket member 41 extends upwardly from the disc 40 and provides a socket adapted to receive a suitable bulb 42 which is illuminated upon being energized by a suitable source of electrical energy, such as the battery 38. A transparent protective cover 43 encompasses the bulb 42, and is normally of a color appropriate to the type of vehicle on which the signal lamp is mounted. In many instances, the lamp 42 is of a rotating beacon type and/or an alternately flashing type so as to enhance detection. A pair of branch conductors 44 connect the lamp 42 with the battery 38 through a control switch 45.

The lamp support disc 40 includes an annular flange 46 radially extended beyond the limits of the mounting base 23 and is adapted to contact a detecting switch 47 mounted on the base 23. The switch 47 is preferably of the microswitch type and is in a normally closed position, except when engaged by the flange 46. A pair of branch conductors 48 connect a second indicator lamp 49 to the battery 38 through switch 47. Accordingly, movement of the flange 46 upwardly away from the base 23 automatically closes the switch 47 and illuminates the second indicator lamp 49. As in the case of the first indicator lamp 39, lamp 49 is also disposed in a position to be observed by the operator of the vehicle.

An audible signal means in the form of a siren 55 is also mounted on the vehicle 10 and adapted to be energized by the battery 38 through branch conductors 56 under the controlled influence of switch 45. It is to be noted that the switch 45 controls the energizing circuits for the bulb 42 and the siren 55, which are arranged in parallel.

*Operation*

The operation of the described embodiment of the subject invention is believed to be readily apparent and is briefly summarized at this point. To use the signaling system of the present invention, either while the vehicle is in motion or stationary, the switch 45 is closed to energize the conductors 44 and illuminate the bulb 42. Since the conductors 56 are also in controlled relationship with the switch 45 and in parallel with conductors 44, the siren 55 is energized at the same time. If desired, independent control switches for the respective signal means may be provided.

To raise the support cylinder 21 to an extended signaling position, opening of the valve 29 admits pressure fluid from the pump 28 through supply line 27 and port 26 to the chamber 22. Upon maximum extension of the cylinder 21, which can be made of any suitable length, pressure within the chamber 22 and supply line 27 exceeds the value required to elevate the light 20. Upon reaching a predetermined value to which the pressure sensing switch 35 is pre-adjusted, the first indicator lamp 39 is illuminated through conductors 36 and 37. Accordingly, the indicator lamp 39 warns the operator that the light 20 has been raised to an extended signaling position.

In addition, the second indicator lamp 49 is illuminated upon raising of the annular flange 46 from engagement with the detector switch 47. Consequently, the switch 47 moves to its normally closed position and thereby energizes conductors 48 to illuminate the lamp 49. In this manner, the operator of the vehicle 10 is warned of the raising of the light 20 from its fully retracted position as well as to the fully extended position shown in FIG. 1.

Upon encountering an obstruction of limited vertical clearance in the path of travel of the vehicle, movement of the valve to an appropriate position returns pressure fluid from the chamber 22 through a return line 57 and permits gravitational lowering of the light 20. Upon the pressure within chamber 22 and supply line 27 decreasing below said predetermined value of switch 35, the first indicator lamp 39 is de-energized. Upon reaching a fully retracted stowing position, the flange 46 contacts switch 47 and thereby opens the circuit which previously energized the scond indicator lamp 49. Accordingly, the operator is at all times warned of the extension and position of elevation of the light 20.

*Second Form*

Figure 3:
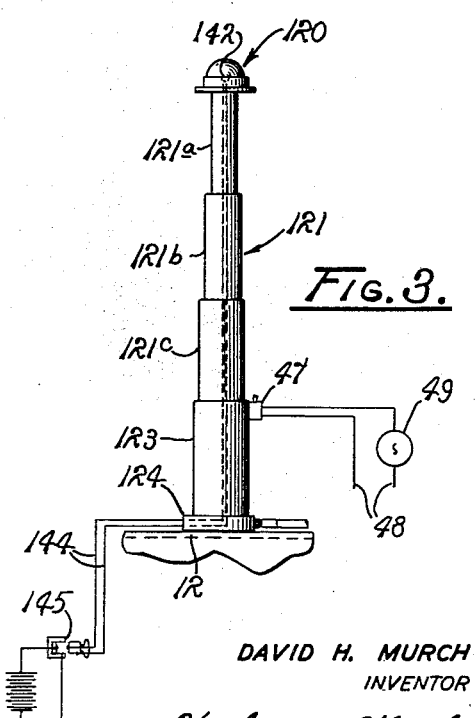
FIG. 3 is a modified form of the signaling system of FIG. 1, and shows a manually extensible support provided with mounting means permitting ready transfer between automotive vehicles.

FIG. 3 illustrates a manually extensible telescopic support cylinder 121 including individual sections 121a, 121b, and 121c of progressively increasing diametrical dimensons. As in the first form, the cylinder 121 is adapted to be telescopically received within a mounting base 123, as well as to be moved to a fully extended position shown in FIG. 3 and thereby dispose a signal light 120 at selective positions of elevation. The mounting base 123 is provided with an attachment flange of permanently magnetic material, thereby facilitating attachment to and removal from a ferromagnetic foundation, such as the roof panel 12 or other similar member normally present in contemporary vehicles.

The signal light 120 is also provided with an electrically energizable bulb 142 having a pair of conductors 144 adapted to be energized by the battery 38 through a control switch 145 in the form of a conventional cigarette lighter. Since this is a common accessory found in most present-day automotive vehicles, the second form of the invention need not be specificaly designed for conventional emergency vehicles, but permits temporary use of a private automobile as an emergency vehicle.

Accordingly, the present invention provides a visual signaling system which facilitates detection and observation of a visual signal, such as a flashing and/or rotating light, by motorists and pedestrians. In addition, the system permits controlled extension and retraction of the visual signal means and incorporates a warning for the operator of the vehicle in the event that an obstruction is encountered which necessitates movement of the signal light to a retracted stowing position.

Having described my invention, what I claim as new and desire to secure by Letters Patent is:

1. A visual signaling system adapted for use on automotive vehicles comprising a source of electrical energy; a signal light energizable by said source; circuit means, including an actuating switch, selectively connecting said source to said signal light to energize the same; a telescopic support cylinder having an outer end and being adapted to be moved by pressure fluid to an extended signaling position and biased toward a retracted stowing position; means connecting said signal light to the cylinder at said outer end; a mounting base secured to an automotive vehicle and adapted to support said telescopic cylinder; a source of pressure fluid; conduit means interconnecting said pressure fluid source and said cylinder, including valve means to control selective extension of the cylinder; an indicator lamp carried by the vehicle; circuit means interconnecting said indicator lamp with sad source of electrical energy, including detecting switch means carried by the vehicle and adapted to be moved between operative and inoperative positions; and detecting switch control means carried by said telescopic cylinder and adapted to engage and move said detecting switch means to an inoperative position upon movement of the cylinder to a retracted stowing position.

2. A visual signaling system adapted for use on automotive vehicles comprising a source of electrical energy; a signal light energizable by said source; circuit means, including an actuating switch, selectively connecting said source to said signal light to energize the same; a telescopic support cylinder having an outer end and being adapted to be moved by pressure fluid to an extended signaling position and biased toward a retracted stowing position; means connecting the light to the cylinder at said outer end; a mounting base secured to an automotive vehicle and adapted to support said telescopic cylinder; a source of pressure fluid; conduit means interconnecting said pressure fluid source and said cylinder, including valve means to control selective extension of the cylinder; indicator means carried by the vehicle at a point remote from said signal light and in a position within the field of vision of an operator of the vehicle; circuit means interconnecting said indicator means with said source of electrical energy, including detecting switch means carried by the vehicle and adapted to be moved between operative and inoperative positions; and detecting switch control means carried by said telescopic cylinder and adapted to engage and move said detecting switch means to an inoperative position upon movement of the cylinder to a retracted stowing position.

3. A visual signaling system adapted for use on automotive vehicles comprising a source of electrical energy; a signal light energizable by said source, including a lamp support disc provided with a radially extending annular flange; circuit means, including an actuating switch, selectively connecting said source to said signal light to energize the same; a telescopic support cylinder having an outer end and being adapted to be moved by pressure fluid to an extended signaling position and biased toward a retracted stowing position; means connecting the lamp support disc to the cylinder at said outer end; a mounting base secured to an automotive vehicle and adapted to support said telescopic cylinder; a source of pressure fluid; conduit means interconnecting said pressure fluid source and said cylinder, including valve means to control selective extension of the cylinder; a first indicator lamp carried by the vehicle in a position within the field of vision of an operator thereof; circuit means interconnecting said first indicator lamp with said source of electrical energy, including a pressure responsive detecting switch in communication with said pressure fluid conduit means and adapted to be moved to a closed position by said pressure fluid reaching a predetermined pressure value; a second indicator lamp carried by the vehicle within said field of vision; circuit means interconnecting said second indicator lamp with said source of electrical energy, including normally-closed detecting switch means carried on said mounting base in a position to be engaged by said annular flange to move said switch to an open position when said telescopic support cylinder is moved to a retracted stowing position and thereby to interrupt the flow of electrical energy to said second indicator lamp.

References Cited in the file of this patent

UNITED STATES PATENTS

| | | |
|---|---|---|
| 2,040,923 | Doane | May 16, 1936 |
| 2,375,121 | McClellan | May 1, 1945 |
| 2,420,772 | Dalton | May 20, 1947 |
| 2,673,404 | Abrahamson | Mar. 30, 1954 |
| 2,786,910 | Tyska | Mar. 27, 1957 |
| 2,924,811 | Popkess et al. | Feb. 9, 1960 |